Jan. 17, 1939. W. G. FOTSCH 2,144,050
LINE SPLICE
Filed May 7, 1936
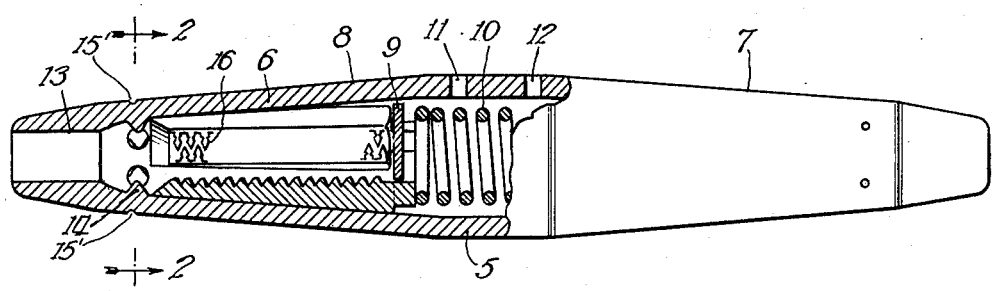
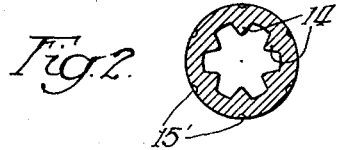
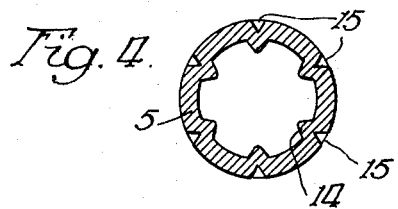
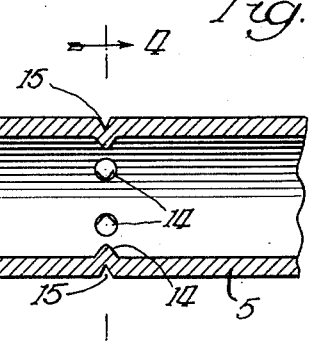
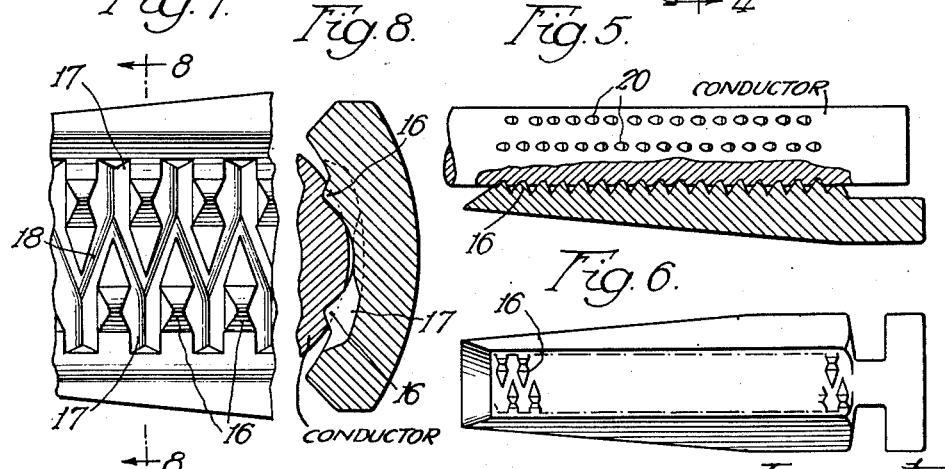
Inventor
William G. Fotsch
By: Zabel Carlson & Wells. Attys.

Patented Jan. 17, 1939

2,144,050

UNITED STATES PATENT OFFICE 2,144,050

LINE SPLICE

William G. Fotsch, Chicago, Ill., assignor to Reliable Electric Company, Chicago, Ill., a corporation of Illinois Application May 7, 1936, Serial No. 78,415

6 Claims. (Cl. 24—126)

This invention relates to line splices of the character shown in my copending application Serial No. 61,036, filed January 27, 1936.

The principal objects of the present invention are to improve such line splices in a manner calculated to prevent the jaws therein from becoming stuck or jammed in the tapered interior of the line splice.

The invention further contemplates improvements in the jaw structure itself whereby the ability of the jaws to hold a wire is increased and whereby the cost of such jaws is materially reduced.

There are certain features of importance in constructing a line splice of this character which features must be provided in order to obtain a good workable device. The line splices are constructed by enclosing sets of gripping jaws and spring means for pressing the jaws outwardly within a metal sleeve and swaging the sleeve so as to taper it from the center toward both ends. The result of this swaging operation is to thicken the metal toward the free ends and to provide tapering surfaces on the interior which surfaces cause the jaws therein to be forced toward each other as they are drawn toward the ends of the sleeve.

One feature which must be provided in a line splice of this type is a close taper to the conductor at the opposite ends of the sleeve so that no shoulders will be provided to catch upon cross arms or other obstructions over which the wire may be pulled in installing it.

Another feature which is necessary is the provision of sufficient spring pressure on the jaws so that the line splice may be connected to the wire before the wire has any tension thereon and kept on the wire without danger of the wire twisting its way out before it is tightened up.

It is also essential in this connection to so construct the gripping jaw surface which engages the wire as to oppose twisting of the wire in the jaws.

It is also important to make the open ends of the line splice cylindrical so as to closely fit a conductor inserted therein. This is done to prevent excess vibration of the wire where it is gripped by the jaws. The cylindrical bores at the opposite ends of the line splice is provided by using a mandrel in swaging the ends of the sleeve. This action, however, develops an increased thickness at the inner end of the cylindrical bore which causes the tapered inner surface immediately adjacent the cylindrical bore to make a greater angle with the axis of the sleeve than that portion in which the sets of the jaws normally operate. The heavy spring used to obtain sufficient grip on the wires to prevent their being twisted out tends to swage the jaws into a steeper tapered portion with such force that they cannot readily be pushed back by the insertion of a conductor through the end of the sleeve.

The invention is shown as embodied in a device which has means to overcome the aforesaid difficulties in a simple and effective manner.

The features and advantages of the invention will appear more clearly from the following description reference being had to the accompanying drawing wherein a preferred form of the invention is shown. It is to be understood, however, that the description and drawing are illustrative only and are not to be taken as limiting the invention except in so far as it is limited by the claims.

In the drawing—

Fig. 1 is a side view partly in section of a line splice embodying the invention;

Fig. 2 is a sectional view on the line 2—2 of Fig. 1;

Fig. 3 is a longitudinal sectional view through a portion of a line splice shell before it is swaged;

Fig. 4 is a sectional view on the line 4—4 of Fig. 3;

Fig. 5 is a longitudinal sectional view through one of the jaws employed in the improved line splice;

Fig. 6 is a plan view of one of the jaws;

Fig. 7 is an enlarged fragmentary plan view showing the jaw structure; and

Fig. 8 is a section on the line 8—8 of Fig. 7 showing how the jaws are embedded in a conductor.

Referring now in detail to the drawing, the line splice shown in Fig. 1 comprises a shell 5 which is swaged down toward its opposite ends to provide elongated conical portions 6 and 7 in which are located sets of jaws such as those indicated at 8. These jaws are usually three in number and, as shown in the prior application hereinbefore referred to, each set of jaws is held in assembled position by a disc 9. A spring 10 is interposed between the two sets of jaws so as to urge them outwardly in gripping position at all times.

Openings such as 11 and 12 are provided for inserting a tool to lock the jaws in retracted position. This locking action is accomplished as described in the prior application by forcing the jaws and the disc 9 inwardly against the pressure of the spring 10 until the tool can be inserted between the disc 9 and the adjacent jaws 8 so as to hold the jaws retracted. In swaging down the ends of the line splice, cylindrical portions such as that shown at 13 are provided at the opposite ends of the shell 5 by inserting a mandrel in the end of the shell.

The jaws when released from the tool which holds them retracted are snapped outwardly by means of the spring pressure with a considerable force. Heretofore, this has resulted in the jaws wedging themselves tightly into the small outer ends of the shell 5 adjacent the cylindrical portions 13 so that they could not be driven back except with great difficulty. Naturally, this action is more pronounced when the spring 10 is stronger.

In order to overcome this difficulty, I provide one or more projections 14 on the inner surface of the tapered portions 6 and 7 of the shell 5 to provide shoulders or stops for the jaws 8. The method I have found effective in providing the projections 14 is to form them by prick punching around the shell 5 with a sharp pointed punch. They may also be formed by rolling an annular groove in the exterior of the sleeve to produce an inwardly extending shoulder. The prick punching is done before the shell is swaged as indicated in Fig. 3 wherein the projections 14 are shown as being produced by metal pushed out from the inner surface of the shell 5. This leaves depressions 15 in the outer surface of the shell 5.

When the shell is swaged, naturally the metal is shifted longitudinally, and, owing to the decrease in diameter of the shell 5 toward the ends, it naturally becomes thicker since no inner mandrel can be provided in the conical portions 6 and 7. When the swaging reaches the depressions 15, these depressions are filled up almost entirely as indicated at 15' on Fig. 1 and Fig. 2 so as to leave the outer surface of the shell with little evidence of the prick punch operation.

This tapering of the shell is also advantageous in making the portions of the projection 14 which are indicated by the jaws 8 extend more nearly across at right angles to the axis of the line splice. The spring 10 is thus prevented from wedging the jaws 8 so that they stick in the shell. The position of the projection 14 is such that the jaws are not wedged against each other in their extreme position.

The jaws 8 are preferably formed, as shown in Figs. 5 to 8 inclusive, with longitudinally spaced projections 16 which are arranged in circumferentially spaced parallel rows. Each jaw may desirably be provided with two rows of projections 16. The material used is a hard alloy which is non-corrosive and which is not brittle so that the projections would have a tendency to break off. A material which I have found to be particularly useful is a commercial copper silicon manganese alloy which is commercially known as "Everdur". This alloy has a characteristic of being hardened by working so that it is possible to form the jaws from a flat piece of metal by a series of pressing operations. The projections are separated longitudinally by rather deep V-shaped grooves 17 which run transversely of the jaw. These grooves 17 are connected between the longitudinal rows of projections by diagonally running grooves 18.

The staggering of the projections and the grooves is particularly advantageous in obtaining a grip upon the conductor which opposes rotation as well as longitudinal movement of the conductor in the jaws. The several projections 16 bite into the material of the conductor as shown by the recesses 20 in Fig. 5. The recesses 20 are staggered with respect to each other so that there is no weakening of the conductor in any circumferential line.

From the above description, it is believed that the construction and advantages of this device will be readily apparent to those skilled in this art. Having thus described my invention, what I claim as new and desire to secure by Letters Patent is:

1. A line splice of the character described comprising a one-piece tubular shell, said shell being reduced in diameter from adjacent the center toward both ends to provide a gripping jaw receiving chamber that gradually decreases in cross-section toward the ends of the shell said shell having substantially cylindrical bearing portions extending inwardly from the ends thereof to the jaw receiving chamber, sets of gripping jaws in said shell, spring means interposed between said sets pressing them outwardly toward the reduced ends of said shell to cause said jaws to grip a conductor inserted therebetween, and inwardly extending projections provided in the jaw receiving chamber inwardly of said bearing portions of said shell adjacent the ends thereof to limit the movement of said sets of jaws outwardly.

2. A line splice of the character described comprising a one-piece tubular shell, said shell being reduced in diameter from adjacent the center toward both ends to provide a gripping jaw receiving chamber that gradually decreases in cross-section toward the ends of the shell said shell having substantially cylindrical bearing portions extending inwardly from the ends thereof to the jaw receiving chamber, sets of gripping jaws in said shell, spring means interposed between said sets pressing them outwardly toward the reduced ends of said shell to cause said jaws to grip a conductor inserted therebetween, and internal shoulders provided in the jaw receiving chamber inwardly of said bearing portions of said shell adjacent the ends thereof to limit the movement of said sets of jaws outwardly, said shoulders comprising an annular series of projections formed on the inner wall of the shell at each end thereof.

3. A line splice of the character described comprising a tubular shell, said shell being reduced in diameter from adjacent the center toward both ends to provide a gripping jaw receiving chamber that gradually decreases in cross-section toward the ends of the shell, sets of gripping jaws in said shell, spring means interposed between said sets pressing them outwardly toward the reduced ends of said shell to cause said jaws to grip a conductor inserted therebetween, said jaws each having longitudinally running rows of projections formed on the conductor engaging face thereof and transversely running grooves between said projections in each row, said grooves separating the individual projections of a row from each other.

4. A line splice of the character described comprising a one-piece tubular shell, said shell being reduced in internal diameter toward the ends thereof to provide a gripping jaw receiving chamber that gradually decreases in cross section toward the ends of the shell, said shell having bearing portions at the ends thereof, sets of gripping jaws in said shell, spring means interposed between said sets of jaws and pressing them outwardly toward the reduced ends of said shell, and internal shoulders provided in the jaw receiving chamber spaced inwardly of said bearing portions of said shell and adjacent the ends of said jaw receiving chamber to limit the movement of said sets of jaws outwardly.

5. A device of the character described comprising a tubular shell, said shell being reduced in internal diameter toward one end thereof to provide a gripping jaw receiving chamber that gradually decreases in cross section toward the end of the shell, said shell having a bearing portion at the end thereof of smaller cross section than the jaw receiving chamber, and said shell having an internal shoulder formed on the tapering inner wall adjacent to but spaced inwardly from said bearing portion.

6. A line splice of the character described comprising a tubular shell, said shell being reduced in diameter from adjacent the center toward both ends to provide a gripping jaw receiving chamber that gradually decreases in cross-section toward the ends of the shell, sets of gripping jaws in said shell, spring means interposed between said sets pressing them outwardly toward the reduced ends of said shell to cause said jaws to grip a conductor inserted therebetween, said jaws each having longitudinally running rows of projections formed on the conductor engaging face thereof and transversely running grooves between said projections in each row, said grooves separating the individual projections of a row from each other, the spaces between rows of projections being cut by shallow grooves which connect with the grooves between the projections of the adjacent rows.

WILLIAM G. FOTSCH.